US010753045B2

(12) United States Patent
Carstensen

(10) Patent No.: US 10,753,045 B2
(45) Date of Patent: Aug. 25, 2020

(54) SYSTEMS AND METHODS FOR PROVIDING FORCE VECTOR COMPENSATED FAN NOZZLES

(71) Applicant: Kadant Inc., Westford, MA (US)

(72) Inventor: Peter Thuroe Carstensen, Adirondack, NY (US)

(73) Assignee: Kadant Inc., Westford, MA (US)

( * ) Notice: Subject to any disclaimer, the term of this patent is extended or adjusted under 35 U.S.C. 154(b) by 1 day.

(21) Appl. No.: 16/022,513

(22) Filed: Jun. 28, 2018

(65) Prior Publication Data

US 2019/0003122 A1    Jan. 3, 2019

Related U.S. Application Data

(60) Provisional application No. 62/526,105, filed on Jun. 28, 2017.

(51) Int. Cl.

| | |
|---|---|
| *D21H 21/02* | (2006.01) |
| *D21F 1/34* | (2006.01) |
| *D21F 1/32* | (2006.01) |
| *B08B 3/02* | (2006.01) |
| *B65G 45/22* | (2006.01) |
| *D21F 7/12* | (2006.01) |

(52) U.S. Cl.
CPC ............. *D21H 21/02* (2013.01); *B08B 3/022* (2013.01); *B65G 45/22* (2013.01); *D21F 1/32* (2013.01); *D21F 1/34* (2013.01); *D21F 7/12* (2013.01); *B08B 2230/01* (2013.01)

(58) Field of Classification Search
USPC ................................................. 162/199, 363
See application file for complete search history.

(56) References Cited

U.S. PATENT DOCUMENTS

| | | | |
|---|---|---|---|
| 1,989,435 A | 1/1935 | Wallquist | |
| 3,830,691 A | 8/1974 | Truesdale et al. | |
| 5,879,515 A * | 3/1999 | Straub | D21F 1/325 |
| | | | 134/122 R |
| 6,254,730 B1* | 7/2001 | Macierewicz | D21F 1/32 |
| | | | 134/172 |
| 6,273,790 B1 | 8/2001 | Neese et al. | |
| 6,468,397 B1* | 10/2002 | Chuang | D21F 1/32 |
| | | | 134/148 |
| 2006/0260063 A1* | 11/2006 | Liew | D21F 1/32 |
| | | | 8/115.51 |

(Continued)

FOREIGN PATENT DOCUMENTS

DE    20212717 U1    10/2002

OTHER PUBLICATIONS

International Search Report & Written Opinion issued by the International Searching Authority in related International Patent Application No. PCT/US2018/040137 dated Sep. 28, 2018, 11 pgs.

(Continued)

*Primary Examiner* — Mark Halpern
(74) *Attorney, Agent, or Firm* — Gesmer Updegrove LLP

(57) ABSTRACT

A method is disclosed of facilitating the removal of contaminates from a belt in a papermaking system. The method includes the step of providing a fluid in a shaped fan such that the interface between the fluid and the belt is non-linear and at least generally forms the shape of an arc.

14 Claims, 5 Drawing Sheets

(56) References Cited

U.S. PATENT DOCUMENTS

2019/0276984 A1* 9/2019 Carstensen .............. D21F 1/34

OTHER PUBLICATIONS

International Preliminary Report on Patentability issued by the International Bureau of WIPO dated Dec. 31, 2019 in related International Application No. PCT/US2018/040137, 8 pages.
Communication pursuant to Rules 161(1) and 162 EPC issued by the European Patent Office dated Feb. 4, 2020 in related European Patent Application No. 18743304.0, 3 pages.

* cited by examiner

SYSTEMS AND METHODS FOR PROVIDING FORCE VECTOR COMPENSATED FAN NOZZLES

PRIORITY

The present application claims priority to U.S. Provisional Patent Application Ser. No. 62/526,105 filed Jun. 28, 2017, the disclosure of which is hereby incorporated by reference in its entirety.

BACKGROUND

The present invention generally relates to paper making equipment and processes, and relates in particular to the removal of contaminates from material and equipment during papermaking processes.

In the paper making process a paper sheet is conveyed through the paper machine by a multitude of belts known as wires in the forming section, felts in the pressing section and dryer fabrics in the dryer section. These serpentine conveying belts fill and/or coat with various contaminates supplied/carried by the paper sheet. Removal of contaminates is necessary to maintain peak efficiency of the paper manufacturing process. A series of showers are typically utilized to remove contaminates from the conveying belts. As herein used, the tem belts refers to all conveying fabrics regardless of paper machine position. The shower(s) are of various configurations and operating pressures, temperatures and flows. A primary application of most showers is to force contaminates through the belts (penetration) or skive contaminates off the surface of the belts (reversion). In each of these two cases, the shower is delivering a water stream that is forcing contaminates from the conveying belts. Such systems however, are not always sufficiently successful in effectively removing contaminates in certain applications.

There remains a need therefore, for systems and methods for more efficiently and effectively removing contaminates from belts during papermaking processes.

SUMMARY

In accordance with an embodiment, the invention provides a method of facilitating the removal of contaminates from a belt in a papermaking system. The method includes the step of providing a fluid in a shaped fan such that the interface between the fluid and the belt is non-linear and at least generally forms the shape of an arc.

In accordance with another embodiment, the invention provides a system for facilitating the cleaning of contaminates from a belt in a papermaking process. The system includes at least one fluid jet that provides a fluid in a shaped fan such that the interface between the fluid and the belt is non-linear and at least generally forms the shape of an arc.

In accordance with a further embodiment, the invention provides a system for facilitating the cleaning of contaminates from a belt in a papermaking process. The system includes a plurality of fluid spray nozzles, each of which provides fluid on the belt in a curved arc pattern.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
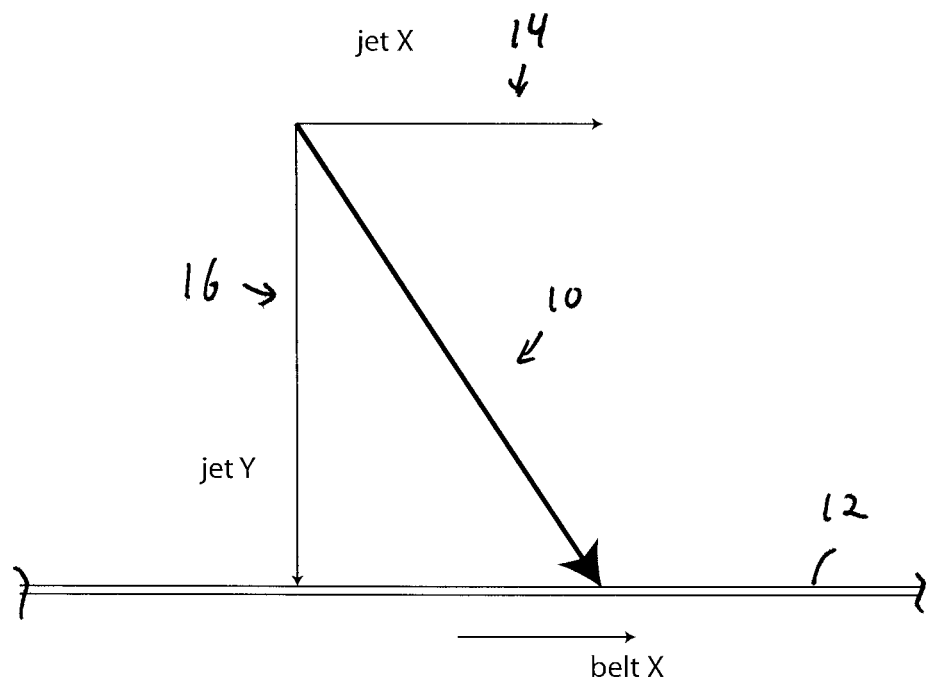
FIG. 1 shows an illustrative diagrammatic view of a force vector with respect to a belt in accordance with an embodiment of the present invention.
Figure 2:
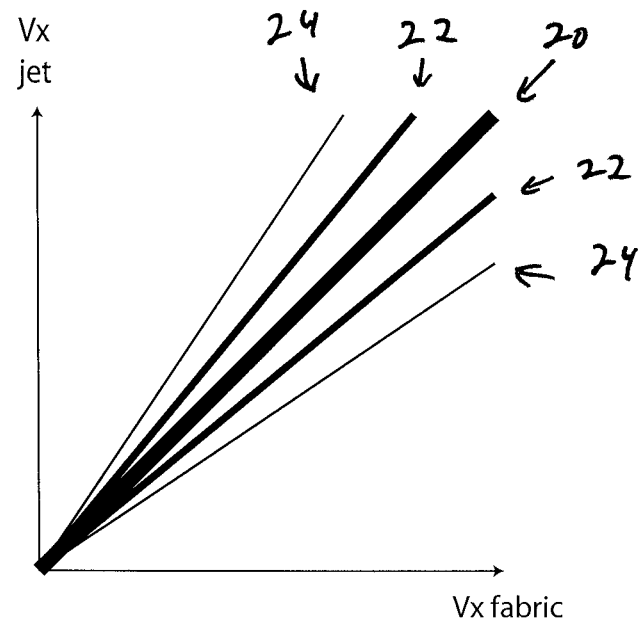
FIG. 2 shows an illustrative diagrammatic view of jet force vectors relative fabric velocity and jet velocity in accordance with an embodiment of the present invention.

The geometric layout of the shower/belt interaction is typically configured in such a manner as to provide the most efficient force vector interaction angle(s) that will provide the desired contaminate removal function. For through penetration cleaning (propelling material through the belt), the system is typically set up such that the water jet X velocity vector value equals the Belt X velocity value so that the Y force vector will motivate the contaminates through the belt. This is shown in FIG. 1, which shows a force vector 10 applied to a moving belt 12, wherein the force vector 10 includes an X direction component as shown at 14, and a Y direction component as shown at 16. This arrangement for through penetration generally applies well for jet type nozzles because the impingement is essentially a single point for each nozzle, and only two axes are needed for best impingement angle determinations. This is shown in FIG. 2, which shows at 20 that the force vector is largest when the jet velocity matches the force velocity. When either the jet velocity or the belt velocity is a little different than the other, the force vector falls off as shown at 22, and when ether the jet velocity or the belt velocity is further different than the other, the force vector is further reduced as shown at 24.

Figure 3:
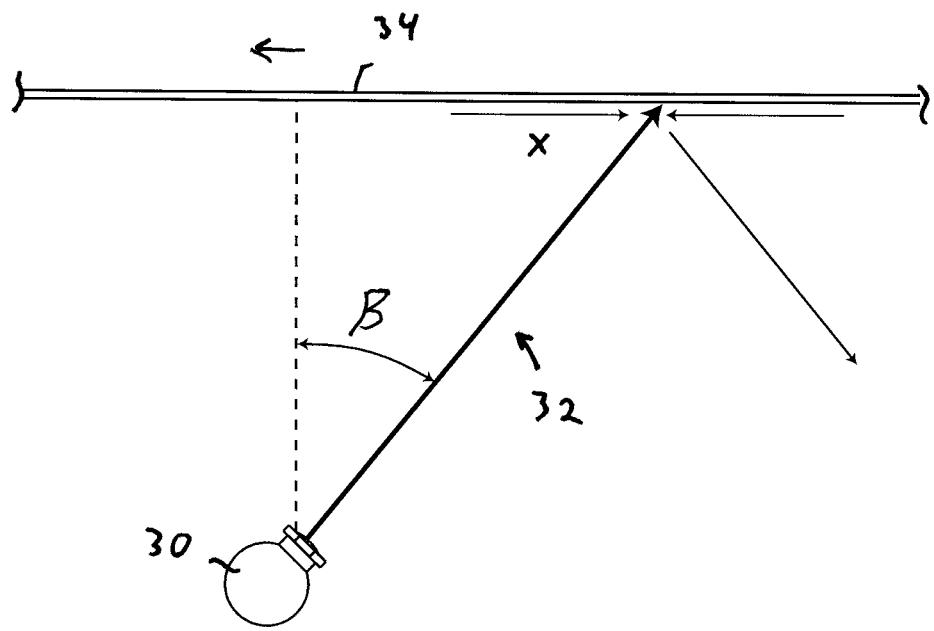
FIG. 3 shows an illustrative diagrammatic view of a reversion contaminate removal system.

Systems that employ fan-type nozzles, generally provide an intersection between the water and the belt as a continuous line (referred to as the foot print), which is generally a straight line across the belt in the Z axis. The Z axis is needed to be compensated for when determining the best impingement intersection angle. When the fan nozzle is used, the result is not equally efficient throughout the delivery spray width because of the linear foot print. The same issues apply to reversion systems (skiving or chiseling applications), where the shower is set up not to penetrate the belt, but to loosen and remove contaminates from the same side at the best impingement angle. In this case, the water fan jet X velocity is set up to oppose the belt X velocity vector. This is shown in FIG. 3, where a nozzle 30 provides a shower as shown at 32 at an angle β that contacts a belt 34 that is moving in a direction opposite the X direction of the shower.

Figure 4:
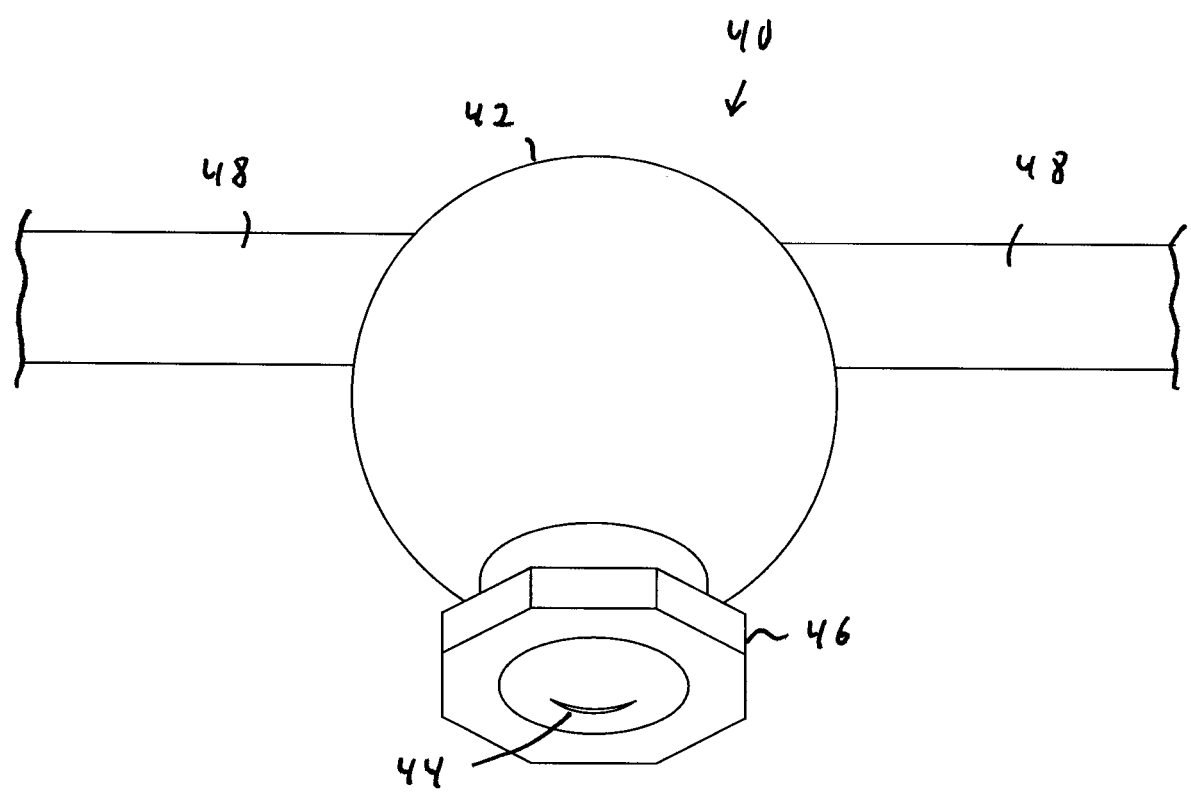
FIG. 4 shows an illustrative diagrammatic view of a fan nozzle in accordance with an embodiment of the present invention.

In accordance with various embodiments and with reference to FIG. 4, a nozzle 40 is provided that is designed for the purpose of developing a fan style spray for imparting equal kinetic force on the full width of delivery at the target foot print. The system may be applied, in an example, with a paper machine serpentine conveying belt, although any application employing a fan spray nozzle specific to delivering kinetic or motivating force would benefit. The nozzle 40 includes a reservoir portion 42 and an opening 44 through which the fluid may be sprayed. The opening 44 may be provided on a removable cover 46 to facilitate removal and replacement of such covers. The opening 44 may be provided in a wide variety of shapes and designs, and may, for example, be provided as an arrangement of very small openings that together cause the fluid to be sprayed in a fan shape in accordance with an embodiment of the present invention. The fluid, e.g., water, may be provided to the nozzle 40 via a conduit 48, which provides the fluid under pressure to the nozzle 40.

Figure 5:
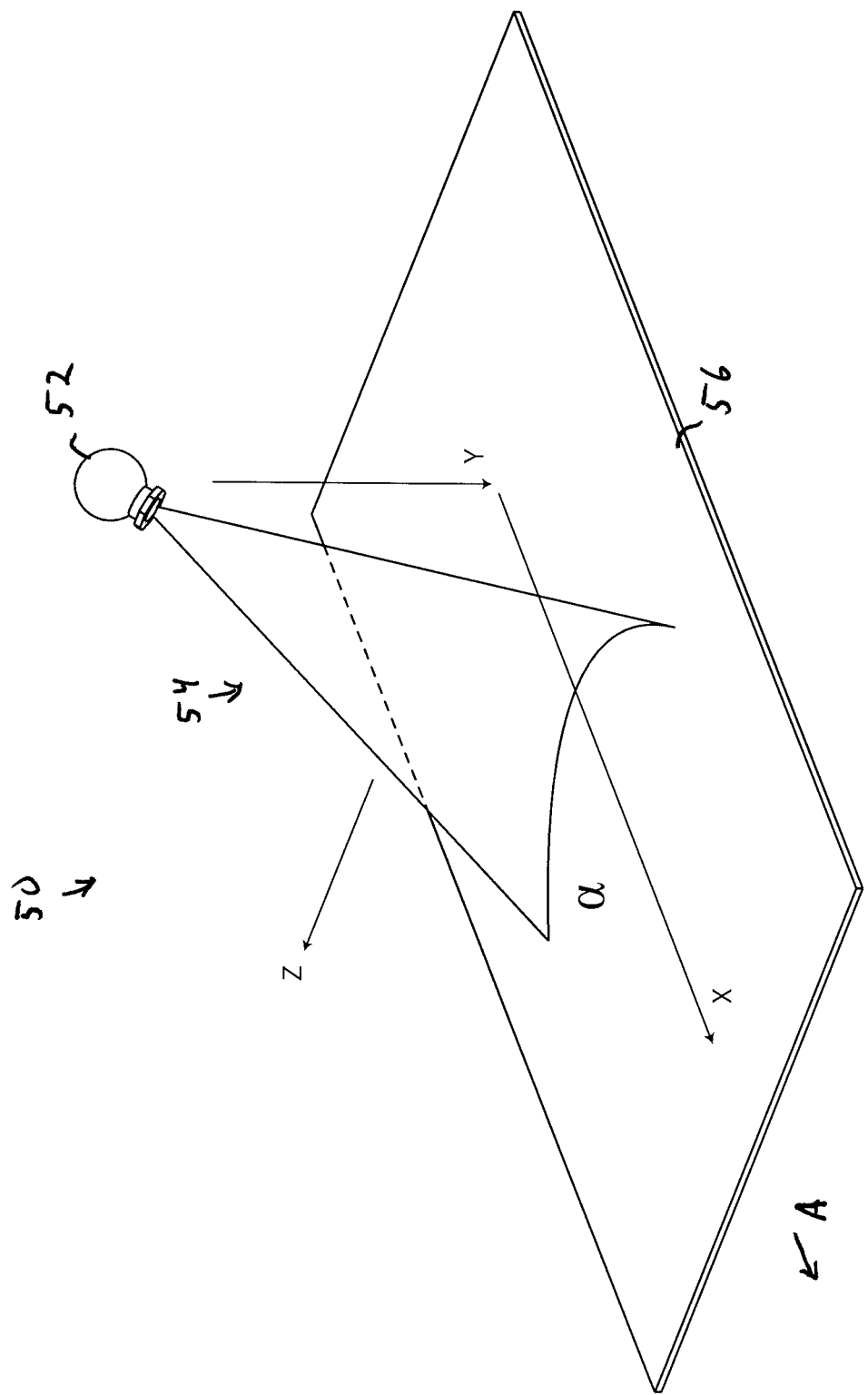
FIG. 5 shows an illustrative diagrammatic view of a fan nozzle system impinging a moving fabric system in accordance with an embodiment of the present invention.

The foot print, (again which is the impingement pattern on the target) is not straight across (Z axis), but would have an arc curve that is the result of the recalculation of the fan impingement angle when including the Z axis angle. This does change the effective X axis velocity at the impingement target intersection. FIG. 5, for example, shows a nozzle system 50 that includes a representative nozzle 52 that is designed and positioned to provide a shower 54 in the shape of an arced fan as shown, that impinges a fabric 56 on a belt. The belt 56 is traveling in a direction as indicated at A, and the shower 54 includes X, Y and Z components such that the X component velocity matches the velocity of the belt 56.

It is this correction and compensation that is to be incorporated into the design of the nozzle so that an arc footprint is delivered. The following example presents the calculation for a vector force compensated fan spray pattern for a 90° fan type nozzle on a 4200 fpm belt with 180 psi using a pattern described by the following development equation.

$$\alpha = \sin^{-1}[\text{fpm}/(\sqrt{2.15 \times \text{psi}} \times 435 \times \cos\theta)]$$

Table 1 below shows results of a calculations for various angles θ in accordance with various embodiments.

TABLE 1

| θ | α |
|---|---|
| 0.00° | 29.4° |
| 11.25° | 30.0° |
| 22.50° | 31.8° |
| 33.75° | 36.1° |
| 45.00° | 44.0° |

Figure 6:
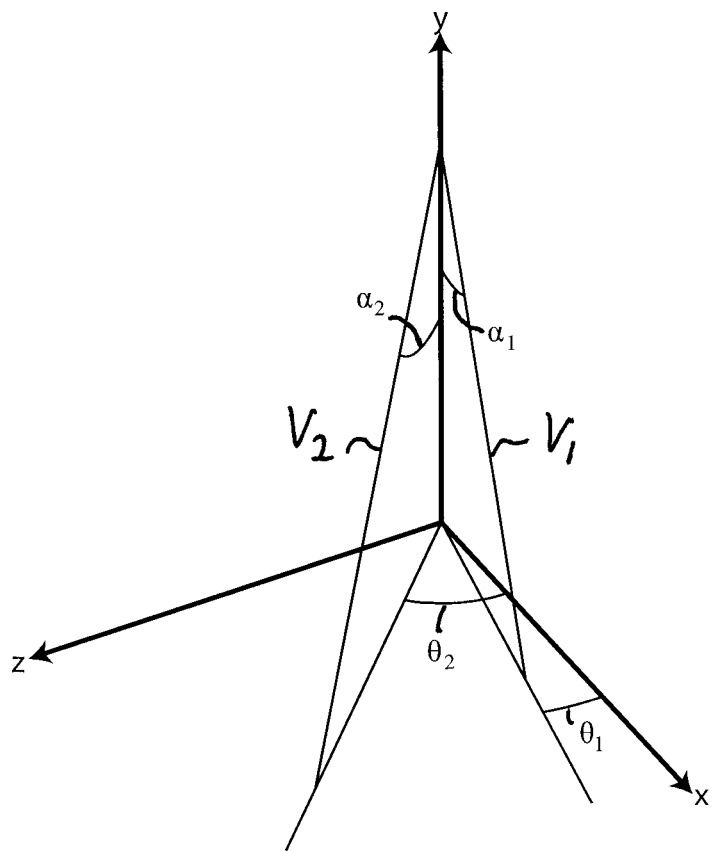
FIG. 6 shows an illustrative diagrammatic graphical representation of fan nozzle vectors at various angles in system in accordance with an embodiment of the present invention.

The resultant impingement spray calculation compensated for a Y axis perpendicular force across the Z axis spray/belt intersection footprint results in an arc pattern. FIG. 6 shows a graphical representation of fan nozzle vectors at various angles in a system in accordance with an embodiment of the present invention. Each vector makes up part of the fan arc pattern, where $\alpha_1$ of vector $V_1$ represents 30° corresponding to a $\theta_1$ of 11.25°. Likewise, $\alpha_2$ of vector $V_2$ represents 44° corresponding to a $\theta_2$ of 45°. As shown in Table 1 and FIG. 6, as the vectors aim farther from the center of the arc, they must aim father upstream of the moving felt to maintain x-direction force to compensate for the increased z-direction force component.

Figure 7:
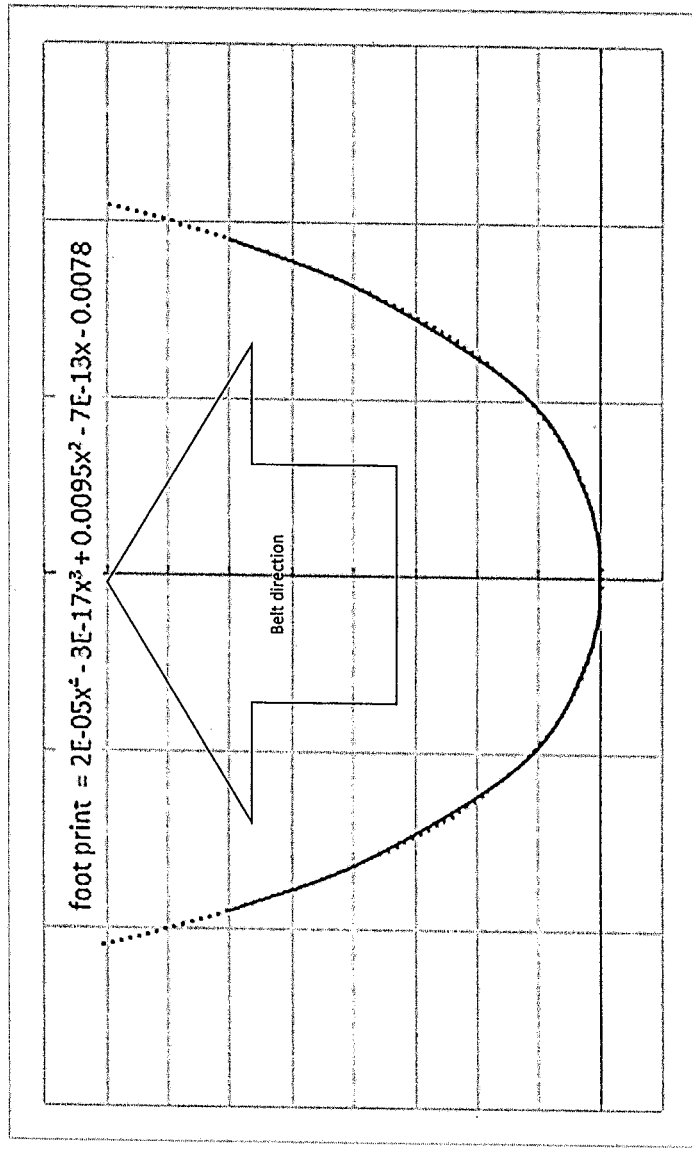
FIG. 7 shows an illustrative diagrammatic view of a fan nozzle system employing multiple nozzles in accordance with an embodiment of the present invention.

FIG. 7 shows a graphical representation of an arc footprint on a belt in a system in accordance with an embodiment of the present invention wherein the footprint is defined by $2E-5x^4-3E-17x^3+0.0095x^2-7E-13x-0.0078$ and wherein the belt direction is shown.

Figure 8:
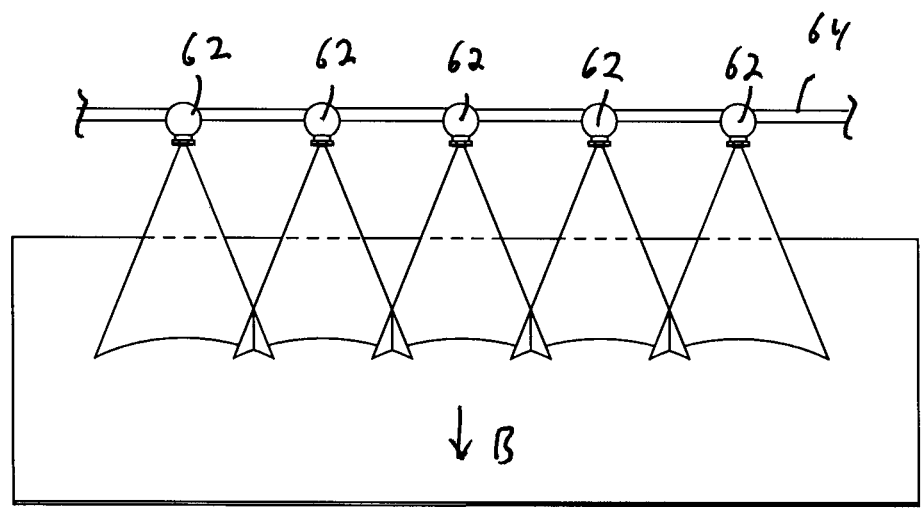
FIG. 8 shows an illustrative diagrammatic graphical representation of a fan nozzle footprint in system in accordance with an embodiment of the present invention.

FIG. 8 shows a system 60 in accordance with an embodiment of the invention that includes multiple nozzles 62 that are commonly coupled to a fluid supply conduit 64 that provides fluid under pressure to the nozzles 62. The nozzles 62 provide the fluid in arced fan spray patterns as discussed above that slightly overlap at their edges at the points of contact with the belt 66 that is moving in a direction as indicated at B.

The invention therefore, provides methods and systems for fan-type spray patterns against a belt in a papermaking process. In particular, systems and methods of the invention facilitate the removal of contaminates from a belt in a papermaking system. The method includes the step of providing a fluid in a shaped fan pattern such that the interface between the water and the belt is non-linear and at least generally forms the shape of an arc. In certain embodiments, outer edges of the shape of the arc are provided at a leading edge of a belt direction. In further embodiments, the arc pattern may be provided as a definition of a that is defined by a relationship that includes belt speed and fluid pressure.

Those skilled in the art will appreciate that numerous modifications and variations may be made to the above disclosed embodiments without departing from the spirit and scope of the present invention.

What is claimed is:

1. A system for facilitating the cleaning of contaminates from a belt in a papermaking process, said system comprising at least one fluid jet that provides a fluid in a shaped fan such that the interface between the fluid and the belt is non-linear and at least generally forms the shape of an arc.

2. The system as claimed in claim 1, wherein outer edges of the shape of the arc are provided at a leading edge of a belt direction.

3. The system as claimed in claim 1, wherein the arc is provided as a definition of a set of angles between the fluid and the belt at the interface of the fluid and the belt that are defined by a relationship that includes belt speed and fluid pressure.

4. The system as claimed in claim 3, wherein the set of angles is provided by:

$$\alpha = \sin^{-1}[\text{fpm}/(\sqrt{2.15 \times \text{psi}} \times 435 \times \cos\theta)]$$

wherein $\alpha$ is the angle with respect to a vertical axis, fpm is the speed of the belt in feet per minute, psi is the pressure of the fluid, and θ is the angle in the horizontal plane about the vertical axis away from the minimum of the arc.

5. The system as claimed in claim 1, wherein the fluid provides penetration cleaning through the belt.

6. The system as claimed in claim 1, wherein the fluid provides reversion cleaning of contaminates away from the belt.

7. The system as claimed in claim 1, wherein the system includes a plurality of fluid jets that each provide a fluid in a shaped fan such that the interface between the fluid and the belt is non-linear and at least generally forms the shape of an arc.

8. A system for facilitating the cleaning of contaminates from a belt in a papermaking process, said system comprising a plurality of fluid spray nozzles, each of the plurality of fluid spray nozzles providing fluid on the belt in a curved arc pattern.

9. The system as claimed in claim 8, wherein outer edges of each curved arc pattern are provided at a leading edge of a belt direction.

10. The system as claimed in claim 8, wherein each arc pattern is provided as a definition of a set of angles between the fluid and the belt at the interface of the fluid and the belt that are defined by a relationship that includes belt speed and fluid pressure.

11. The system as claimed in claim 10, wherein the set of angles is provided by:

$$\alpha = \sin^{-1}[\text{fpm}/(\sqrt{2.15 \times \text{psi}} \times 435 \times \cos\theta)]$$

wherein $\alpha$ is the angle with respect to a vertical axis, fpm is the speed of the belt in feet per minute, psi is the pressure of the fluid, and $\theta$ is the angle in the horizontal plane about the vertical axis away from the minimum of the arc.

12. The system as claimed in claim 10, wherein the set of angles is selected such that the force of the fluid on the belt is countered by movement of the belt such that the resultant force of the fluid on the belt is substantially in the vertical direction.

13. The system as claimed in claim 8, wherein the fluid provides penetration cleaning through the belt.

14. The system as claimed in claim 8, wherein the fluid provides reversion cleaning of contaminates away from the belt.

\* \* \* \* \*